US007089264B1

(12) United States Patent
Guido et al.

(10) Patent No.: US 7,089,264 B1
(45) Date of Patent: Aug. 8, 2006

(54) GEOGRAPHIC DATABASE ORGANIZATION THAT FACILITATES LOCATION-BASED ADVERTISING

(75) Inventors: Matthew A. Guido, Chicago, IL (US); Christopher Dougherty, Highland Park, IL (US); Roy Casino, Mundelein, IL (US)

(73) Assignee: Navteq North America, LLC, Chicago, IL (US)

(*) Notice: Subject to any disclaimer, the term of this patent is extended or adjusted under 35 U.S.C. 154(b) by 441 days.

(21) Appl. No.: 09/887,198

(22) Filed: Jun. 22, 2001

(51) Int. Cl.
*G06F 17/00* (2006.01)
*G06F 7/00* (2006.01)

(52) U.S. Cl. .......................... 707/104.1; 707/3; 705/26
(58) Field of Classification Search ................ 705/26; 707/100, 104, 104.1, 3
See application file for complete search history.

(56) References Cited

U.S. PATENT DOCUMENTS

| | | | |
|---|---|---|---|
| 5,627,549 A * | 5/1997 | Park ........................... 701/300 |
| 5,664,948 A * | 9/1997 | Dimitriadis et al. ..... 434/307 R |
| 6,122,520 A | 9/2000 | Want et al. .................. 455/456 |
| 6,199,045 B1 | 3/2001 | Giniger et al. ................. 705/1 |
| 6,202,022 B1 | 3/2001 | Ando ........................ 701/200 |
| 6,208,866 B1 | 3/2001 | Rouhollahzadeh et al. .. 455/456 |
| 6,223,122 B1 | 4/2001 | Hancock et al. ............ 701/200 |
| 6,259,381 B1 | 7/2001 | Small .......................... 340/988 |
| 6,266,612 B1 | 7/2001 | Dussell et al. .............. 701/207 |
| 6,353,398 B1 | 3/2002 | Amin et al. ................. 340/995 |
| 6,360,167 B1 | 3/2002 | Millington et al. ......... 701/211 |
| 6,381,465 B1 | 4/2002 | Chern et al. ................ 455/466 |
| 6,414,602 B1 * | 7/2002 | Polyakov ................. 340/691.6 |
| 6,415,226 B1 * | 7/2002 | Kozak ......................... 701/210 |
| 6,438,561 B1 * | 8/2002 | Israni et al. .............. 707/104.1 |
| 6,452,498 B1 * | 9/2002 | Stewart .................... 340/573.1 |
| 6,604,083 B1 | 8/2003 | Bailey .......................... 705/10 |
| 6,654,800 B1 * | 11/2003 | Rieger, III .................. 709/223 |
| 6,785,551 B1 | 8/2004 | Richard .................... 455/456.1 |
| 2001/0018340 A1 * | 8/2001 | Tagi .......................... 455/414 |
| 2001/0043148 A1 * | 11/2001 | Stewart ...................... 340/988 |
| 2002/0002552 A1 * | 1/2002 | Schultz .......................... 707/3 |
| 2002/0023010 A1 * | 2/2002 | Rittmaster ................... 705/26 |
| 2002/0032035 A1 * | 3/2002 | Teshima ..................... 455/456 |
| 2002/0065691 A1 * | 5/2002 | Twig et al ..................... 705/7 |
| 2002/0147644 A1 * | 10/2002 | Subramanian et al. ........ 705/14 |

(Continued)

FOREIGN PATENT DOCUMENTS

WO    WO 00/49530    8/2000

*Primary Examiner*—Greta Robinson
*Assistant Examiner*—Kuen S. Lu
(74) *Attorney, Agent, or Firm*—Jon D. Shutter; Frank J. Kozak; Grace L. O'Brien

(57) ABSTRACT

A method of facilitating delivery of advertising to users of mobile computing platforms is disclosed. A geographic database contains data entities that represent geographic features, such as roads, located in a geographic region. Advertising zones are defined within the geographic region. Associated with at least some of the data entities that represent geographic features are data that indicate in which of the advertising zones the represented geographic feature is located. Advertisers are allowed to associate advertising messages with the advertising zones. Users of mobile computing platforms are provided with geographically-related services that use the geographic database. As a user of a mobile computing platform travels in the geographic region, the location of the mobile computing platform is determined. The user of the mobile computing platform is provided with the advertising message associated with the advertising zone in which the mobile computing platform is determined to be located.

14 Claims, 9 Drawing Sheets

U.S. PATENT DOCUMENTS

2003/0013449 A1     1/2003  Hose et al. .................. 455/440
2003/0023489 A1*    1/2003  McGuire et al. .............. 705/14
2003/0026268 A1*    2/2003  Navas ........................ 370/400
2004/0076279 A1*    4/2004  Taschereau ............ 379/218.01
2004/0083133 A1*    4/2004  Nicholas et al. .............. 705/14
2004/0110515 A1*    6/2004  Blumberg et al. ....... 455/456.1

* cited by examiner

ADVERTISING ZONE BASED ON ACCESSIBILITY (DRIVING TIME FROM BUILDING ABC)

ADVERTISING ZONE BASED ON ACCESSIBILITY (DRIVING DISTANCE BUILDING ABC)

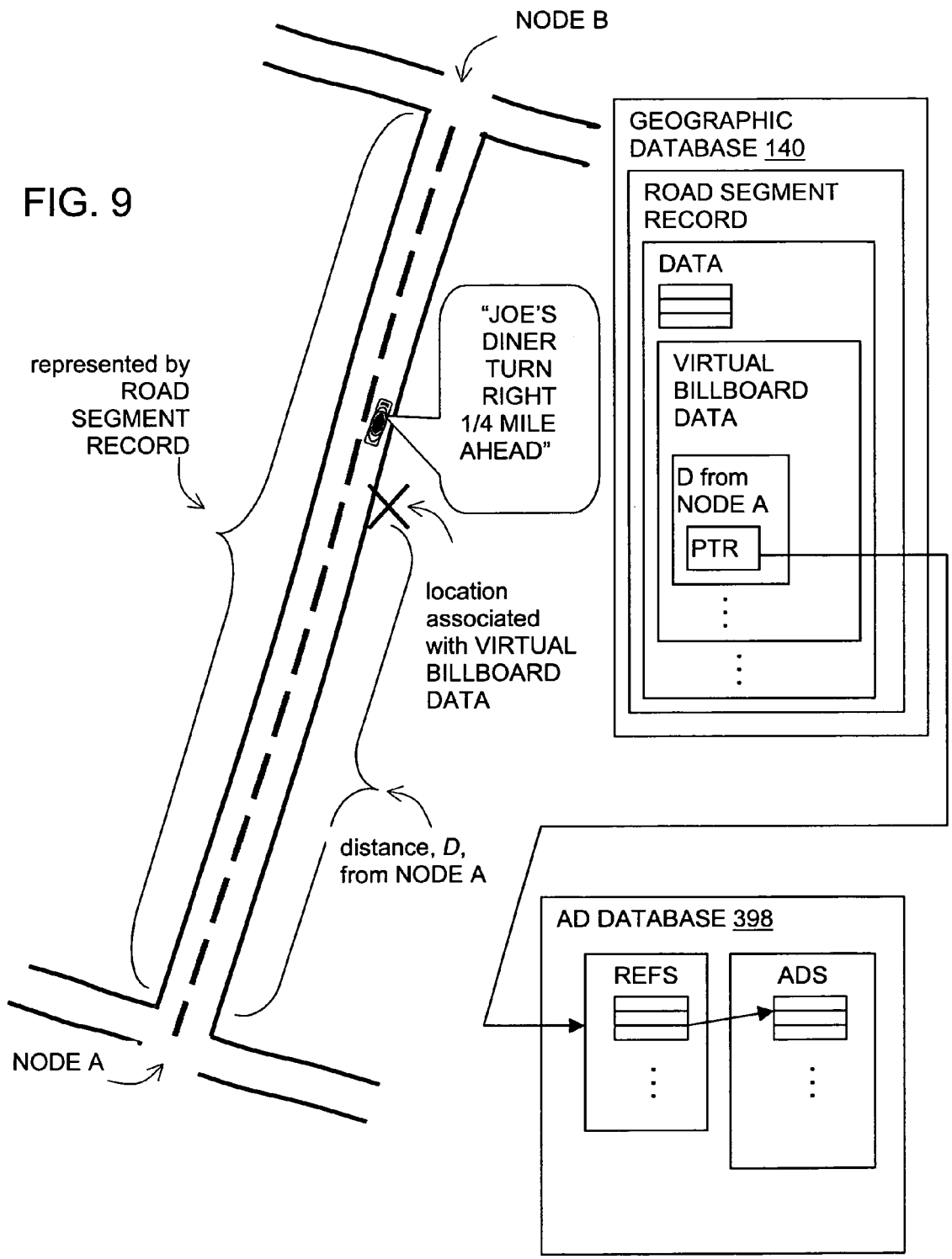

GEOGRAPHIC DATABASE ORGANIZATION THAT FACILITATES LOCATION-BASED ADVERTISING

BACKGROUND OF THE INVENTION

The present invention relates to a geographic database organization that facilitates location-based advertising.

Persons who travel through a geographic region can use different types of mobile or portable computing platforms to obtain various geographically-related features and services. Mobile or portable computing platforms that provide geographically-related features and services include dedicated computing devices and general purpose computing devices. Dedicated computing devices include in-vehicle navigation systems and personal (i.e., portable or hand-held) navigation systems. General purpose computing devices include devices, such as portable personal computers (e.g., notebook computers) and personal digital assistants (e.g., PDAs). General purpose computing devices can provide geographically-related features and services by operating navigation application software or by using geographic data. Mobile or portable computing platforms that provide geographically-related features and services include standalone systems that have geographic data and navigation application software installed locally, client devices that access geographic data or navigation application software located at a remote location, and hybrid devices that have some geographic data or navigation application software installed locally but obtain or use geographic data or navigation application software located at a remote location.

Some of the various geographically-related features and services provided by the different types of mobile or portable computing platforms include route calculation and guidance. For example, some mobile or portable computing platforms are able to provide users with an optimum route to travel by roads between locations in a geographic region. Using input from an end user, and optionally from equipment that can determine the end user's physical location (such as a GPS system), a navigation application program used by a mobile or portable computing platform system examines various paths between two locations to determine an optimum route to travel from a starting location to a destination location in the geographic region. The user of the mobile or portable computing platform is then provided with information about the optimum route in the form of instructions that identify the maneuvers required to be taken by the end user to travel from the starting location to the destination location.

Another geographically-related feature provided by some mobile or portable computing platforms is business or person finding services (e.g., electronic yellow or white pages). These services can identify addresses of individuals or businesses. These services can also identify for a user which businesses of a certain type (e.g., Chinese restaurants) are located within a given range (e.g., 3 miles) of a given location.

Although present mobile or portable computing platforms that provide geographically-related features and services are able to provide many useful advantages, there continues to be room for improvement. One area in which there is room for improvement relates to providing information to end users based upon their location. Some types of information, such as advertising, can be more effective or useful if it is restricted to only certain specific locations. For example, a gas station located in Chicago would not advertise to users located in Miami.

Accordingly, it is an objective to provide a means to provide directed information based upon location.

It is another objective to provide a means to deliver advertising to end users who are traveling in a geographic region.

SUMMARY OF THE INVENTION

To address these and other objectives, the present invention comprises a method of facilitating delivery of advertising to users of mobile computing platforms. A geographic database contains data entities that represent geographic features, such as roads, located in a geographic region. Advertising zones are defined within the geographic region. Associated with at least some of the data entities that represent geographic features are data that indicate in which of the advertising zones the represented geographic features are located. Advertisers are allowed to associate advertising messages with the advertising zones. Users of mobile computing platforms are provided with geographically-related services that use the geographic database. As a user of a mobile computing platform travels in the geographic region, the location of the mobile computing platform is determined. The user of the mobile computing platform is provided with the advertising message associated with the advertising zone in which the mobile computing platform is determined to be located.

BRIEF DESCRIPTION OF THE DRAWINGS

FIG. 9 illustrates formation and use of virtual billboard locations used in connection with another alternative embodiment.

DETAILED DESCRIPTION OF THE PRESENTLY PREFERRED EMBODIMENTS

I. The Geographic Map Database

Figure 1:
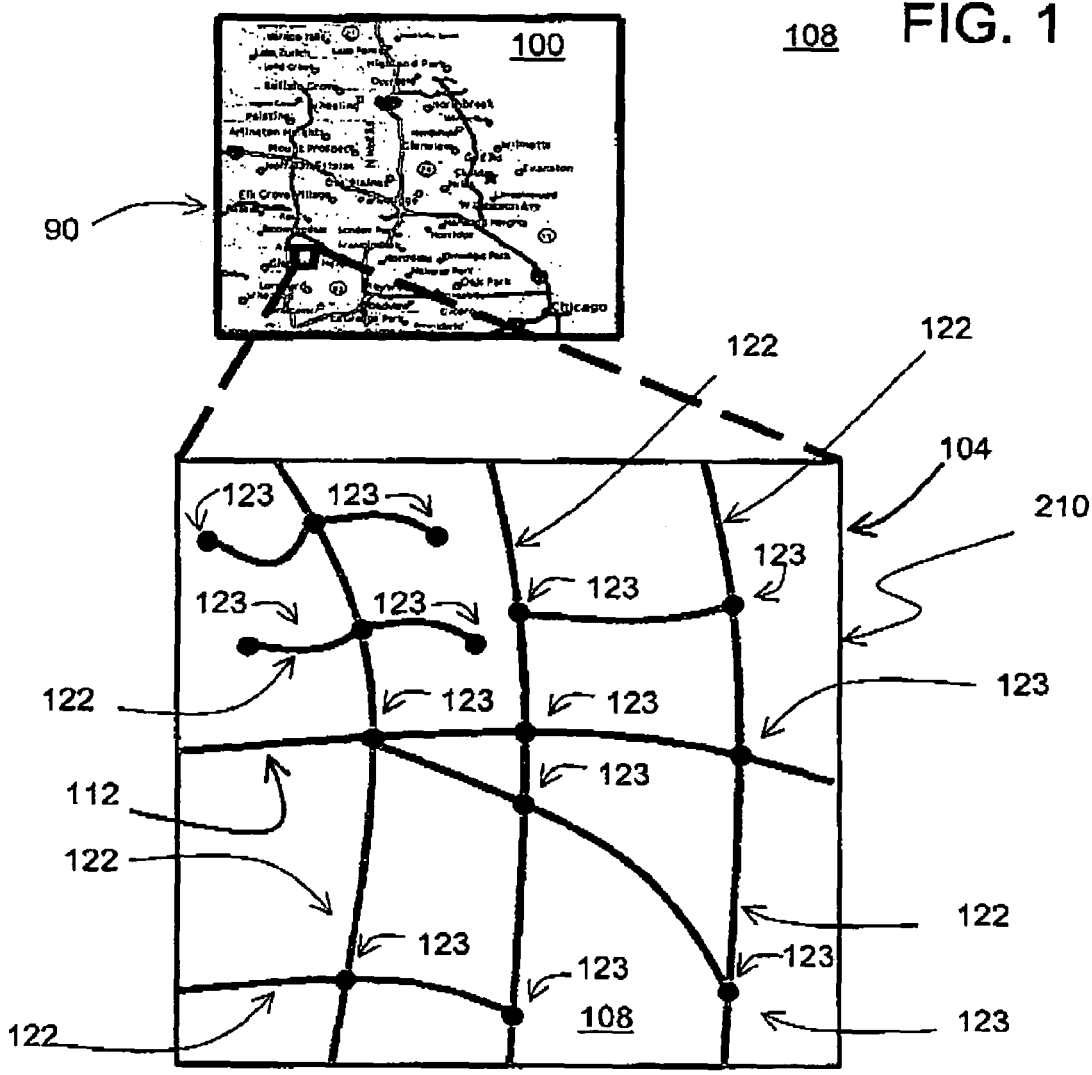
FIG. 1 shows a map of a geographic region and is used to describe an embodiment for organizing the data representing the geographic features located in the geographic region.

FIG. 1 shows a map 90 of a geographic region 100. The geographic region 100 may correspond to a metropolitan or rural area, a state, a country, or combinations thereof, or any other area of comparable size. Located in the geographic region 100 are physical features, such as roads, points of interest (including businesses, municipal facilities, etc.), lakes, rivers, railroads, municipalities, houses, etc.

FIG. 1 also includes an enlarged map 104 of a portion 108 of the geographic region 100. The enlarged map 104 illustrates part of the road network 112 in the geographic region 100. The road network 112 includes, among other things, roads and intersections located in the geographic region 100. As shown in the portion 108, each road in the geographic region 100 is composed of one or more road segments 122. A road segment 122 represents a portion of the road. Each road segment 122 is shown to have associated with it two nodes 123: one node represents the point at one end of the road segment and the other node represents the point at the other end of the road segment. The node at either end of a road segment may correspond to a location at which the road meets another road, e.g., an intersection, or where the road dead ends.

Figure 2:
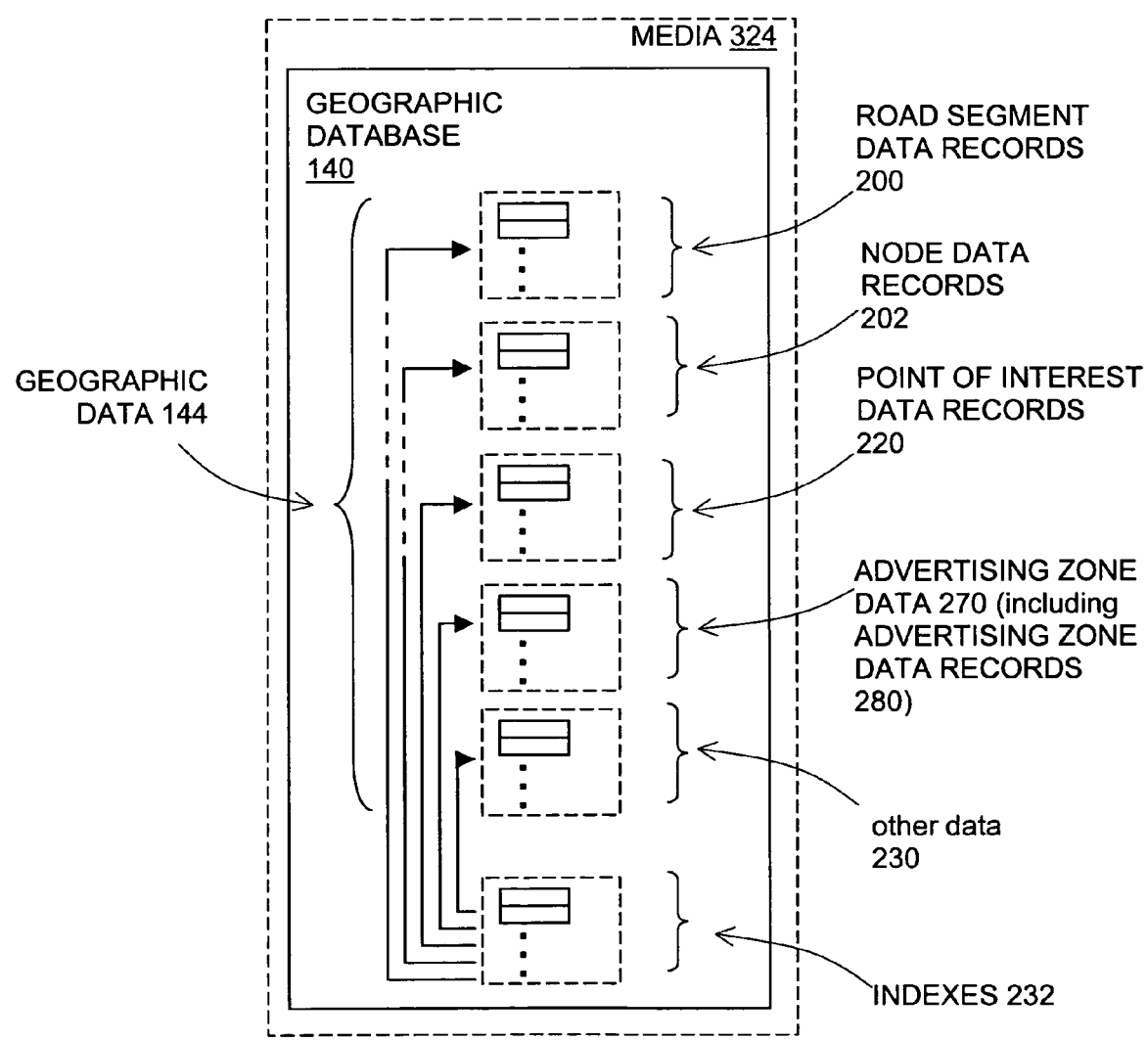
FIG. 2 is a block diagram of a geographic database that represents the geographic region of FIG. 1.

Referring to FIG. 2, a geographic database 140 contains data 144 that represents some of the physical features in the geographic region (100 in FIG. 1). The data 144 contained in the geographic database 140 includes data that represent the road network. In the embodiment of FIG. 2, the geographic database 140 that represents the geographic region 100 contains at least one database record (also referred to as "entity" or "entry") for each road segment 122 in the geographic region (100 in FIG. 1). In the geographic database 140 that represents the geographic region 100, there is also a database record (or "entity" or "entry") for each node 123 in the geographic region 100. (The terms "nodes" and "segments" represent only one terminology for describing these physical geographic features and other terminology for describing these features is intended to be encompassed within the scope of these concepts.)

Figure 3:
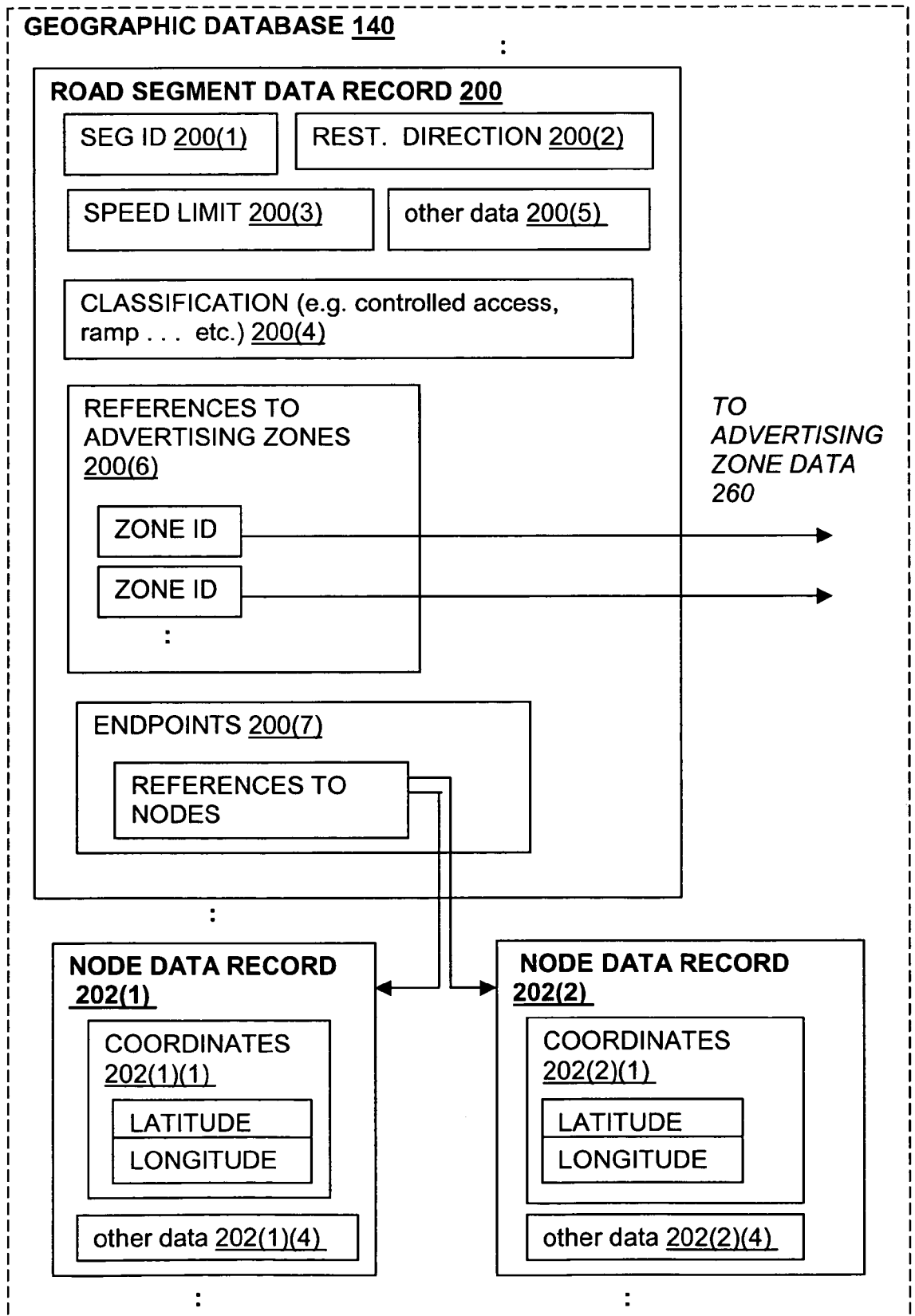
FIG. 3 is a block diagram showing a road segment data record contained in the geographic database of FIG. 2.

FIG. 3 shows some of the components of a road segment data record 200 contained in the geographic database 140. The road segment record 200 includes a segment ID 200(1) by which the data record can be identified in the geographic database 140. Each road segment data record 200 has associated with it information (such as "attributes", "fields", etc.) that describes features of the represented road segment. The road segment data record 200 may include data 200(2) that indicate the restrictions, if any, on the direction of vehicular travel permitted on the represented road segment. The road segment data record 200 includes data 200(3) that indicate a speed limit or speed category (i.e., the maximum permitted vehicular speed of travel) on the represented road segment. The road segment data record 200 may also include data 200(4) indicating whether the represented road segment is part of a controlled access road (such as an expressway), a ramp to a controlled access road, a bridge, a tunnel, a toll road, a ferry, and so on.

The road segment data record 200 also includes data 200(7) providing the geographic coordinates (e.g., the latitude and longitude) of the endpoints of the represented road segment. In one embodiment, the data 200(7) are references to the node data records 202 that represent the nodes corresponding to the endpoints of the represented road segment.

The road segment data record 200 may also include or be associated with other data 200(5) that refer to various other attributes of the represented road segment. The various attributes associated with a road segment may be included in a single road segment record, or may be included in more than one type of record which are cross-referenced to each other. For example, the road segment data record 200 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 202 may have associated information (such as "attributes", "fields", etc.) that allows identification of the road segment(s) that connect to it and/or its geographic position (e.g., its latitude and longitude coordinates).

Referring to FIG. 2, in a present embodiment, the geographic database 140 includes point of interest data 220. The point of interest data 220 represent the various points of interest located in the geographic region 100. Points of interest include businesses, municipal buildings, historical markers, buildings, etc. The point of interest data 220 include point of interest data records. Each point of interest data record includes data attributes that relate to the represented point of interest. For example, each point of interest record may include a type (e.g., the type of point of interest, such as restaurant, hotel, city hall, police station, historical marker, ATM, golf course, etc.), the location of the point of interest, a phone number, hours of operation, etc.

The geographic database 140 may also include other kinds of data 230. The other kinds of data 230 may that represent other kinds of geographic features or anything else.

The geographic database 240 also includes indexes 232. The indexes 232 may include various types of indexes that relate the different types of data to each other or that relate to other aspects of the data contained in the geographic database 140.

II. Advertising Zones

Figure 4:
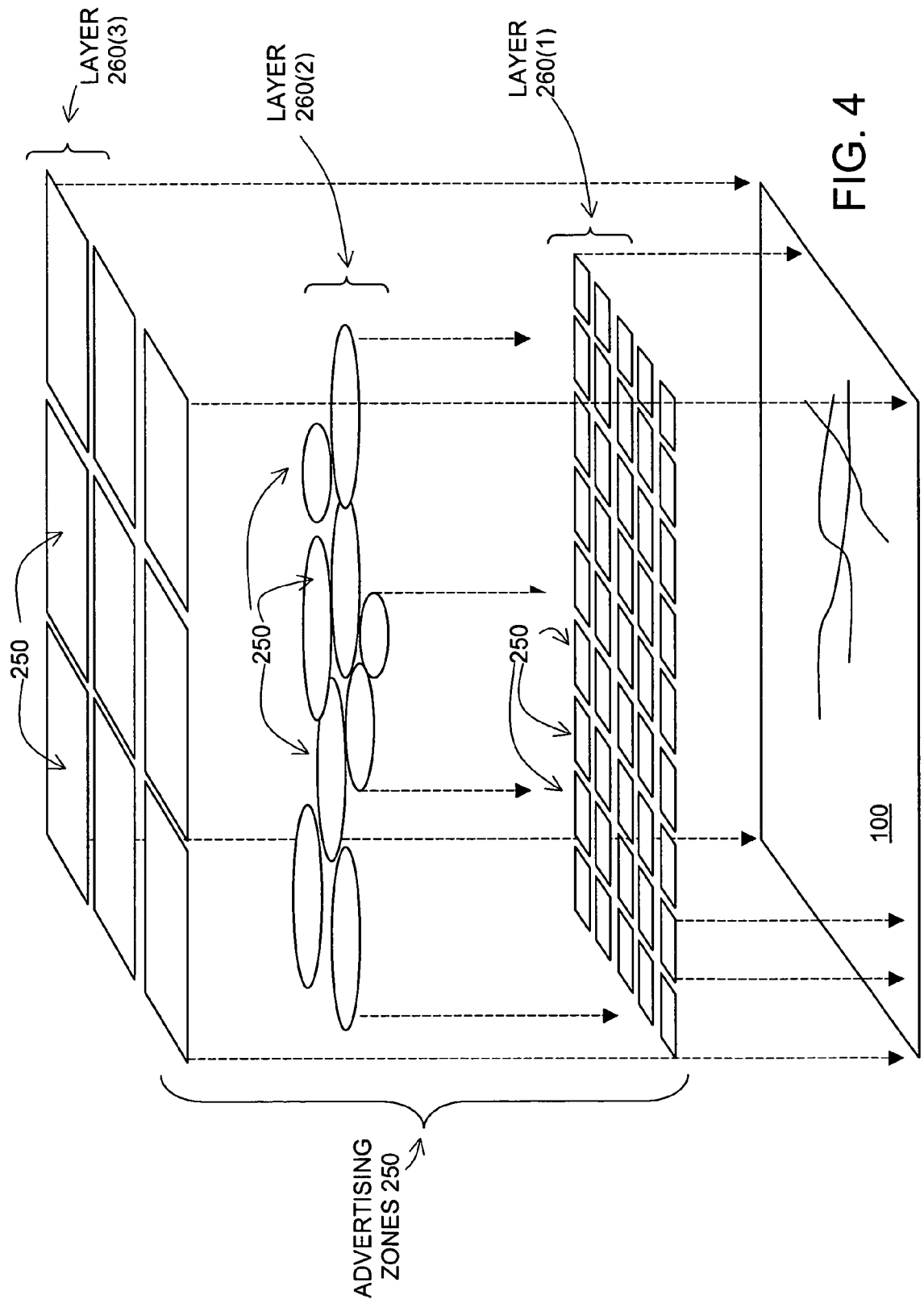
FIG. 4 illustrates formation of advertising zones within the geographic region of FIG. 1.

FIG. 4 shows a perspective view of the geographic region 100. In a present embodiment, the developer of the geographic database 100 defines a plurality of advertising zones 250 within the geographic region 100. The advertising zones are defined as bounded areas located within the geographic region 100. The advertising zones 250 may be all the same size and shape. Alternatively, as shown in FIG. 4, the advertising zones 250 may be different sizes and/or shapes.

In the embodiment of FIG. 4, the advertising zones are defined in separate layers 260(1), 260(2) . . . 260(n). Each layer includes a separate plurality of advertising zones. The advertising zones defined in one layer may overlap the advertising zones defined in another of the layers. Within a layer, each advertising zone may be distinct from every other advertising zone within the layer, i.e., within a layer, advertising zones do not overlap. Alternatively, advertising zones within a layer may overlap to some extent. Also, the advertising zones within a layer may be coextensive with the entire geographic region or alternatively, the advertising zones within a layer may not be coextensive with the entire geographic region, i.e., there may be locations within the geographic region that are not encompassed within an advertising zone.

The sizes of the advertising zones and the boundaries of the advertising zones are determined so that each advertising zone has an appropriate size and boundaries for targeted advertising. Different types of businesses have different kinds of advertising requirements. As an example, a fast food restaurant in an urban area may want to advertise within a three mile area around the location of the restaurant, but not beyond three miles because it is unlikely that many consumers would travel more than three miles to get to the restaurant. On the other hand, a department store may want to advertise within 20 miles of its location, but not beyond 20 miles. Thus, different sizes of advertising zones are provided for different kinds of businesses.

Each of the different layers of advertising zones may be identified by zone type. Various different types of advertising zone may be defined.

There are other considerations that can affect the sizes and boundaries of the advertising zones. One consideration is premium advertising. For example, a business, such as a restaurant, may want to be an exclusive advertiser for a certain area. Another consideration is balance. If too many businesses of the same type advertise in a certain area, the value of the advertising diminishes. Another consideration is population density. Persons in sparsely populated areas may be willing to drive further to get to the locations of businesses than persons in densely populated areas. Accordingly, advertising zones in sparsely populated areas may be larger, in general, than corresponding advertising zones in densely populated areas.

Because the sizes of the advertising zones are determined based on appropriate sizes for targeted advertising, the boundaries of advertising zones do not necessarily correspond to the boundaries of cities, towns, counties, etc. Likewise, the boundaries of advertising zones do not necessarily correspond to the rectangular areas defined for data parcels (as described in U.S. Pat. No. 5,974,419).

Referring to FIG. 2, the geographic database 140 that represents the geographic region (100 in FIG. 1) includes advertising zone data 270. The advertising zone data 270 represent the advertising zones (250 in FIG. 4) that have been defined by the geographic database developer for the region (100 in FIG. 1). In a present embodiment, the advertising zones 250 are represented by advertising zone data records 280. In this embodiment, each advertising zone 250 is represented by an advertising zone data record 280.

Figure 5:
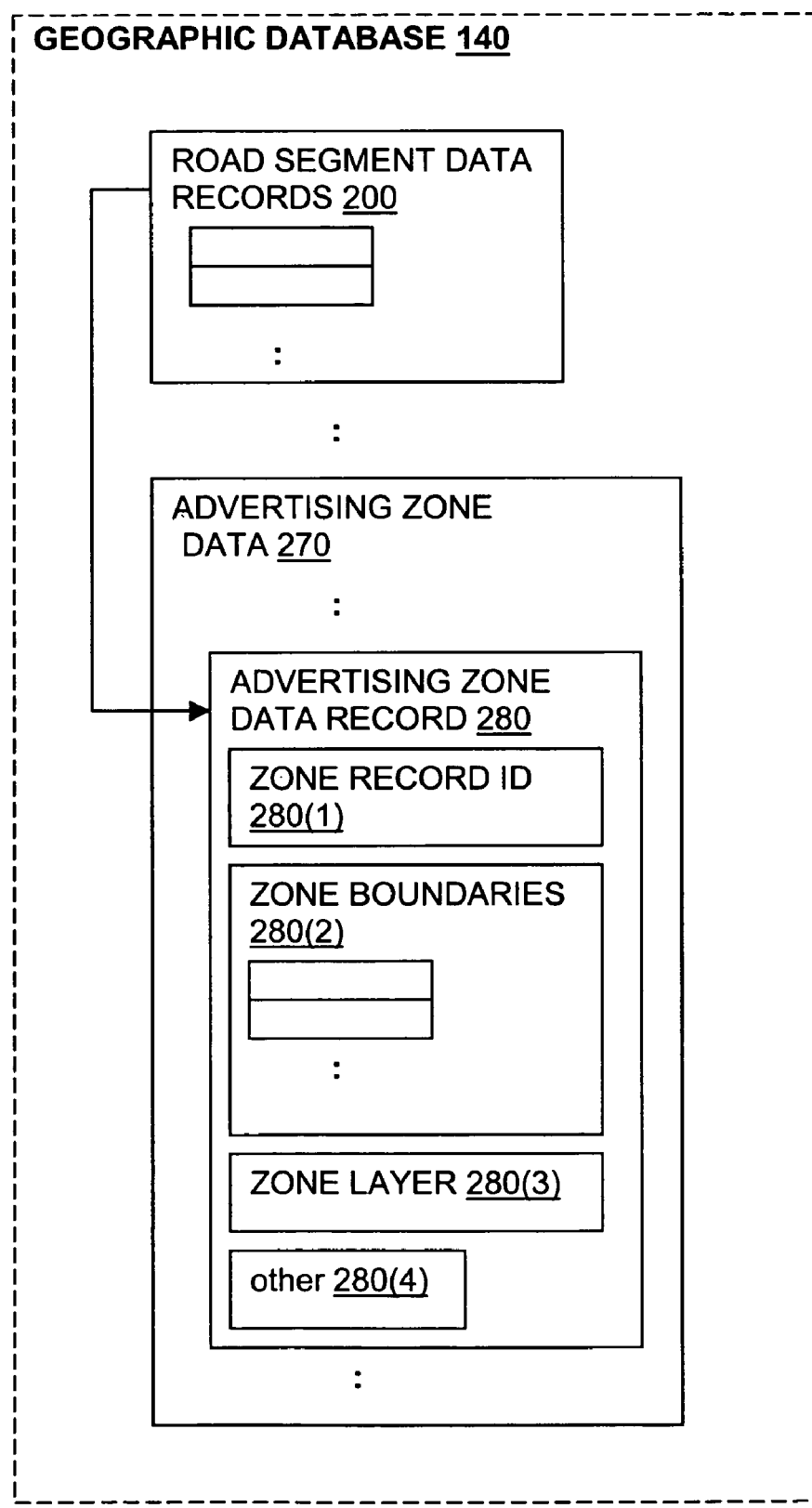
FIG. 5 is a block diagram showing an advertising zone data record contained in the geographic database of FIG. 2.

FIG. 5 shows components of an advertising zone data record 280. An advertising zone data record 280 includes a data record ID 280(1) by which the advertising zone data record is identified in the geographic database 140. In addition, the advertising zone data record 280 includes attributes that describe the represented advertising zone. In FIG. 5, the advertising zone data record 280 includes boundary data 280(2). The boundary data 280(2) indicate the boundaries of the represented advertising zone. The boundary data 280(2) may include the geographic coordinates of the boundaries. Alternatively, the boundary data 280(2) may include a radius from a point. According to another alternative, the boundary data 280(2) may be defined in terms of the geographic database structure, e.g., in terms of parcel boundaries. According to yet another alternative, the boundary data 280(2) may be defined in terms of geographic features, e.g., streets, rivers, etc. The boundary data 280(2) may include any type of information that sufficiently defines the boundaries of the represented advertising area.

The advertising zone data record 280 also includes a layer ID 280(3). The layer ID 280(3) identifies the layer (260 in FIG. 4) in which the represented advertising zone is located.

The advertising zone data record 280 may also include other data 280(4).

Referring to FIG. 3, the road segment data record 200 includes data 200(6) that identifies the advertising zone(s) 250 in which the represented road segment is located. In the embodiment of FIG. 3, data 200(6) that identifies the advertising zone(s) 250 refers to the advertising zone data records 270 that represent the advertising zones 250 in which the represented road segment is located.

Figure 6:
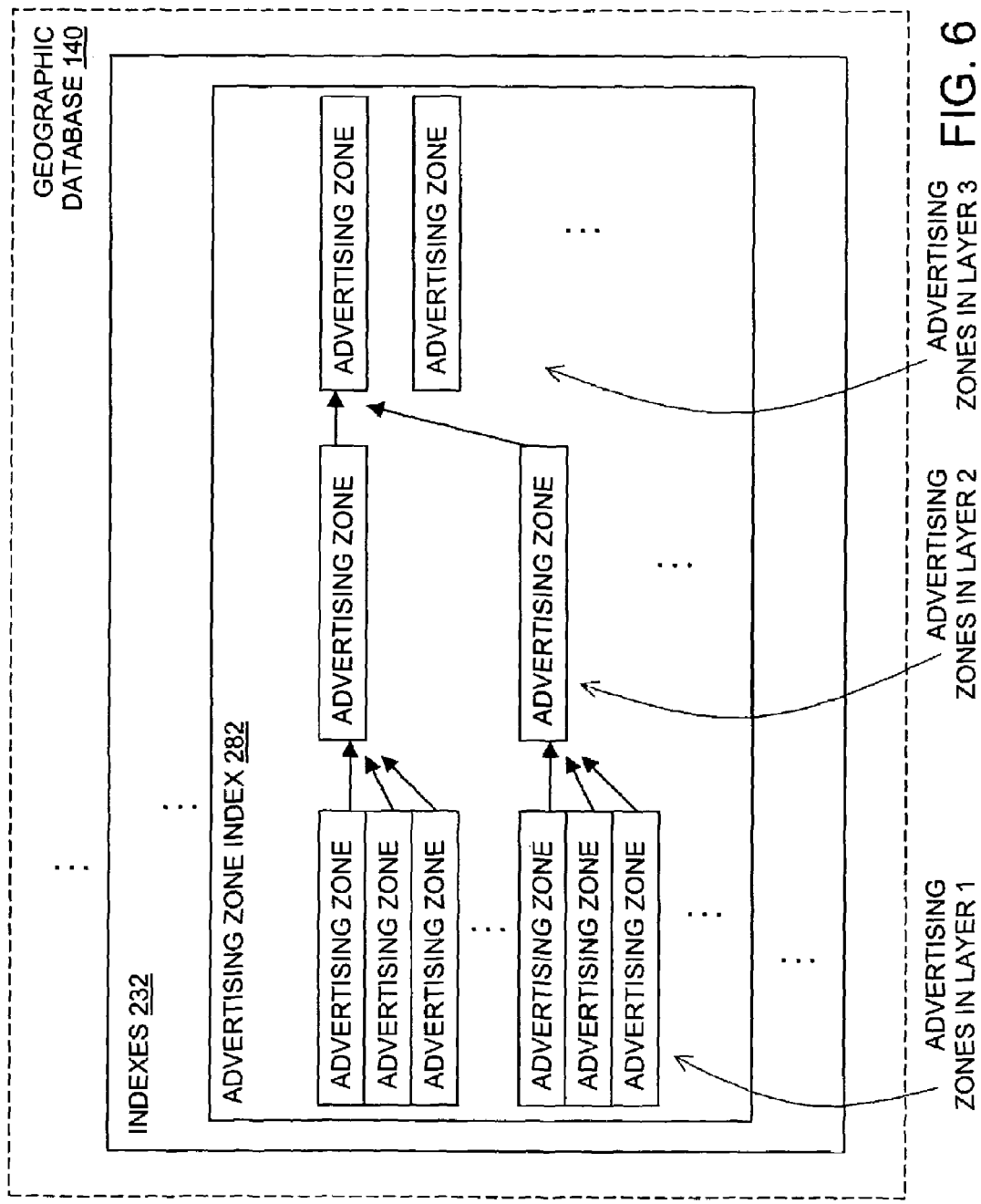
FIG. 6 is a block diagram showing an advertising zone index contained in the geographic database of FIG. 2.

As mentioned above, advertising zones 250 may be organized in layers 260. The relationship between the advertising zones in one layer and the advertising zones in another layer may be represented in an index. Referring to FIG. 6, according to one embodiment, the geographic database 140 includes an advertising zone index 282. The advertising zone index 282 is included in the geographic database 140 among the indexes 232. The advertising zone index 282 indicates relationships between advertising zones in different layers. The advertising zone index 282 may indicate which advertising zones in different layers correspond to the same areas. For an advertising zone in one layer, the advertising zone index may indicate which advertising zone(s) in another layer overlaps the advertising zone.

III. Navigation System

As mentioned above, there are various different kinds of mobile or portable computing platforms that provide geographically-related features and services. One embodiment of a navigation system is described in connection with FIG. 7.

Figure 7:
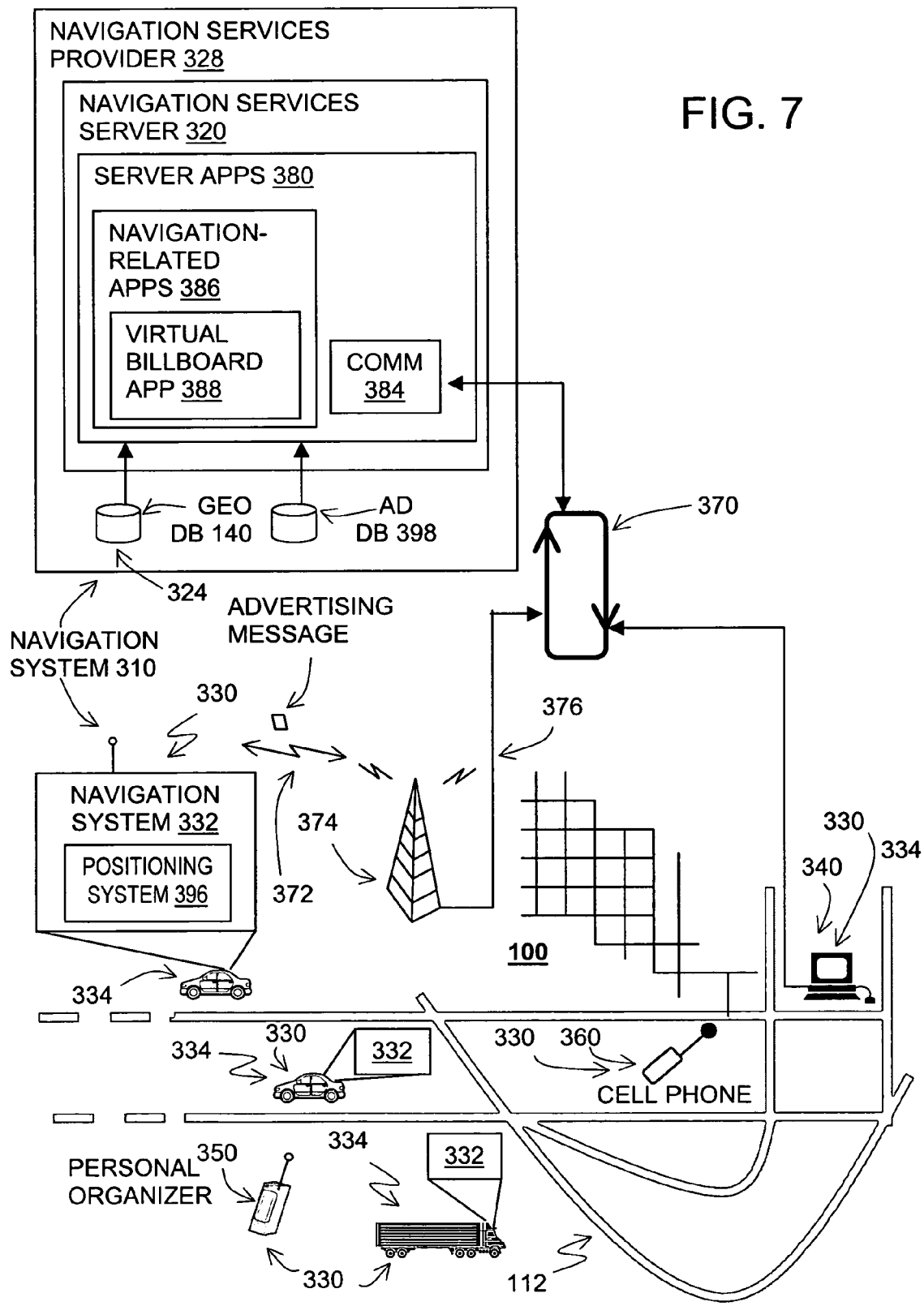
FIG. 7 is a diagram of a navigation system located in the geographic region of FIG. 1.

FIG. 7 shows the geographic region 100 and a portion of the road network 112. A navigation system 310 serves end users (e.g., vehicle drivers and passengers, as well as other persons) in the geographic region 100. The navigation system 310 is used by the end users to obtain navigation-related services (including map-related services) with respect to the geographic region 100. The navigation-related services include information about travel along the road network 112, including route calculation and guidance, people and business finding services (e.g., electronic yellow and white pages), maps, point of interest searching, destination selection, and so on.

The navigation system 310 is a combination of hardware, software and data. The navigation system 310 includes remote components (i.e., hardware, software or data located at a central location that is remote from the end users) and local components (i.e., hardware, software, or data located physically with each end user).

Included among the remote components of the navigation system 310 is a navigation services server 320. The navigation services server 320 includes appropriate computer hardware and software to run network applications. The navigation services server 320 is maintained and operated by a navigation services provider 328.

Associated with the navigation services server 320 is the geographic database 140. The geographic database 140 is stored on a storage medium 364 that is accessible to the navigation services server 320. The storage medium 364 may include one or more hard drives or other storage media. The geographic database 140 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein. In one embodiment, the geographic database 140 is developed by Navigation Technologies Corporation of Chicago, Ill. However, it is understood that the inventive concepts disclosed herein are not restricted to any particular source of data.

The local components of the navigation system 310 include the various computer platforms 330 operated by the end users to request and obtain navigation-related and map-related features and geographic data from the navigation services provider 328. These various computer platforms 330 (also referred to as "end user computing platforms" or "client computing platforms") may include navigation system units 332 located in vehicles 334, personal computers 340, personal organizers (e.g., PDAs, PalmPilot®-type devices) 350, wireless phones 360, or any other types of computing devices that have the appropriate hardware and software to access the navigation services provider 328 over a data network 370.

The data network 370 may use any suitable technology and/or protocols that are currently available, as well as technology and/or protocols that become available in the future. For example, the data network may use WAP, TCP/IP, etc. More than one protocol may be used in the data network 370 with appropriate conversions. The data network 370 may be part of, or connected to, the Internet.

A portion of the network 370 may include a wireless portion 372. The wireless portion 372 of the data network 370 enables two-way communication between the mobile end user computing platforms 330 and the service provider 328. The wireless portion 372 may be implemented by any suitable form of wireless communication, including cellular, PCS, satellite, FM, radio, or technologies that may be developed in the future. The wireless portion 372 may include one or more transmitters 374, such as a transponder tower, an antenna tower, an FM tower, satellites, or other suitable means. The transmitters 374 include an appropriate communication link 376 to the network 370 and/or service provider 328. This link 376 may be land-based or may be wireless. The transmitters 374 include suitable technology that enables two-way communication between the service provider 328 and the mobile end user computing platforms 330.

The navigation system 310 of FIG. 7 can accommodate different types of end user computing platforms 330. The navigation system 310 of FIG. 7 allows end users who have different types of computing platforms 330 to obtain navigation services from the navigation services provider 328 and to obtain and use geographic data provided from the navigation services provider 328.

Referring to FIG. 7, server applications 380 are included on the navigation services server 320 of the navigation services provider 328. The server applications 380 may be stored on one or more hard drive(s) or other media operated by the server 320 and loaded into a memory of the server 320 to run. One of the server applications 380 is a communications application 384. The communications application 384 interfaces with the data network 370 in order to receive messages from and send messages to the end users.

Included among the server applications 380 are navigation-related applications 386. The navigation-related applications 386 use the geographic database 140 associated with the navigation services server 320 in order to provide the various different types of navigation-related services. In order to provide navigation-related features, the navigation-related applications 386 use data from the geographic database 140.

One of the navigation-related applications 386 is route calculation. End users may access the navigation services provider 328 to obtain route calculation. Given data that identify the positions of an origin and destination, the route calculation application calculates a route between the origin and the destination. The route calculation application may use any of various means or algorithms for this purpose. Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Another of the navigation applications on the server 320 is route guidance. Route guidance uses the output from the route calculation application to provide instructions for the end user to travel to the desired destination. Methods for providing route guidance using geographic data are disclosed in U.S. Pat. No. 6,199,013, the entire disclosure of which is incorporated herein by reference.

Referring to the embodiment of FIG. 7, some of the end user computing platforms 330 include positioning equipment 396. The positioning equipment 396 may include a GPS system, inertial sensors, wheel pulse sensors, etc. Using this positioning equipment 396, the position of the end user's computing platform 330 can be determined. Methods for determining position are disclosed in U.S. Pat. No. 6,192,312, the entire disclosure of which is incorporated by reference herein.

Using data that indicate the end user's positions, the route guidance application on the navigation services server 320 may determine the appropriate times and locations at which to provide maneuvering instructions.

IV. Selling of Virtual Advertising Space

The navigation services provider (328 in FIG. 7) enters into agreements with advertisers to provide location-based advertising messages to end users. The agreements with advertisers provide that advertising messages will be sent to end users based on the advertising zone(s) in which the end users are located. An advertiser can choose to send advertising messages to end users located in only a single advertising zone. An advertiser can also choose to send messages to end users in several advertising zones.

The advertising messages may be text messages, audio messages, graphics messages, or combinations of these.

There are various alternative ways that location-based advertising messages may be provided to end users. An advertiser may choose to be the exclusive advertiser for a specific advertising zone or zones. The agreement between the navigation services provider 328 and the advertiser may specify a duration of time (e.g., one month) during which advertising messages will be sent to end users located in the advertising zone(s) selected by the advertiser. The agreement between the navigation services provider 328 and the advertiser may specify how frequently advertising messages will be sent to end users in the selected advertising zone(s) (e.g., only once upon entering the advertising zone or every 15 minutes after entering the advertising zone and while still in the advertising zone). The agreement between the navigation services provider 328 and the advertiser may also specify times that advertising messages will be sent to end users in the selected advertising zone(s), between 6:00 AM and 6:00 PM.

Referring to FIG. 7, the advertising messages that will be sent to end users are stored in an ad database 398 associated with the navigation services server 320. The ad database 398 may be located on the same media as the geographic database 140 or may be on another media. The advertising messages in the ad database 398 are associated with one or more advertising zones. Each advertising message in the ad database 398 may refer or point to one or more advertising zones. In the ad database, the advertising message may indicate the advertising zone to which it is related by referring to the advertising zone ID (280(1) in FIG. 5). Also included in the ad database is data that indicates any restrictions for delivering the advertising messages, e.g., only once, only between certain hours of the day, only on certain days of the week, etc.

V. Operation

Referring to FIG. 7, end users are located through the geographic region 100. The end users move about the geographic region 100. The end users use various means of transportation to move throughout the geographic region 100. For example, end users may use automobiles, trucks, buses, bicycles, motorcycles, trains, taxis, horses, and so on. End users may also move throughout the geographic region by foot. As the end users move throughout the geographic region, they use mobile or portable computing platforms to obtain geographically-relates services and features. As an end user travels through the geographic region 100, the position of the end user is determined. The position of the end user may be determined by positioning equipment associated with the end user's computing platform (such as positioning system 396 in FIG. 7). The position of the end user may be determined by other methods. For example, the position of the end user may be determined by network-based location identification (e.g., emergency 911 services). The position of the end user may also be determined by obtaining the end user's input.

Included among the applications 380 on the navigation services server 320 is a virtual billboard application 388. The virtual billboard application 388 receives data that indicate each end user's current position. Then, based on the end user's current position, the virtual billboard application 388 identifies each advertising zone (or advertising zones) in which the end user is located. The virtual billboard application 388 uses the geographic database 140 for this purpose. The virtual billboard application 388 retrieves from the ad database 398 the advertising messages associated with the advertising zone in which the end user is located. The virtual billboard application 388 also checks the ad database 398 for any restrictions on delivery of the advertising messages.

Assuming that there are no restrictions against sending the advertising message, the virtual billboard application 388 sends the advertising message to the end user. In the embodiment of FIG. 7, the advertising message is sent over the data network 370 to the end user's computing platform 330. On the end user's computing platform 330, the advertising message from the navigation services provider 320 is received and delivered to the end user. The advertising message is delivered via the user interface of the end user's computing platform 330. As mentioned above, the advertising message may be audio or video. If the advertising message is audio, it is provided via a speaker of the user interface of the end user's computing platform. If the advertising message is video, it is provided via a display screen of the end user's computing platform. The adverting message may include both audio and video.

As mentioned above, the agreement between the advertiser and the navigation services provider may specify how frequently the advertising message is provided. The advertising message may be provided only once, e.g., when the end user first enters the advertising zone to which the advertising message is associated. Alternatively, the advertising message may be provided at intervals, e.g., every 15 minutes, while the end user remains in the advertising zone.

VI. Alternatives

A. Other Types of Messages (1). Emergency Messages

In the above embodiments, it was described how location-based advertising messages can be provided to end users of computing platforms that provide navigation services. In an alternative embodiment, other types of messages can be provided to end users of computing platforms that provide navigation services. As an example, the zones can be used to provide location-based emergency messages to end users. The emergency messages can relate to adverse weather conditions, such as tornadoes, hurricanes, hail, blizzards, ice, thunderstorms, floods, or high temperatures. Location-based emergency messages may also relate to environmental conditions, such as hazardous waste spills and ozone warnings.

As mentioned above, there may be different types of zones. Zones used for emergency messages may be defined differently than zones used for advertising. For example, zones used for emergency messages may have different boundaries, sizes, etc. Zone used for emergency messages may be identified by type, e.g. emergency zones, in order to distinguish them from zones used for advertising purposes. According to one embodiment, an index can be used to relate emergency zones to advertising zones.

(2). Traffic Messages

In another alternative embodiment, zones can be used to provide location-based messages that provide traffic information. The traffic information can relate to all the roads within a specific zone. For example, a zone can be defined around a sports stadium. Before and after an event at the sports stadium, location-based messages about traffic congestion around the sports stadium can be provided to the end users located in the zone.

Traffic information messages may also relate to accidents located in zones.

Zones used especially for location-based traffic messages may be defined as traffic zones and identified as traffic zones in the geographic database used by the navigation services provider. Zones used for location-based traffic messages may be cross-referenced (by appropriate indexes) to other types of zones, such as advertising zones and emergency zones.

B. Levels of Service

In the embodiments described above, advertising messages are sent to end users based upon the advertising zones in which the end users' computing platforms are located, as well as any restrictions associated with particular messages. According to an alternative embodiment, there may be additional factors that affect whether some or all advertising messages are sent to particular end users. One additional factor that may affect whether advertising messages are sent to an end user is a service level. A navigation services provider may offer different levels of service to end users. These different levels of service may cost different amounts. End users who subscribe to a higher level of service may receive fewer or no advertising messages whereas end users who subscribe to a lower level of service receive more advertising messages.

C. Standalone Systems

As explained above, there are different kinds of mobile and portable computing platforms that end users can use to obtain geographically-based features and services. As further explained above, these different kinds of mobile and portable computing platforms include standalone systems, such as in-vehicle navigation systems. With a standalone system, the navigation application software and geographic database are located locally, i.e., with the navigation system unit in the vehicle.

Location-based advertising can be provided to end users who use standalone computing platforms to obtain geographically-related features and services. With a standalone computing platform, the geographic database, which is stored locally, includes the advertising zone data, including any necessary indexes. An ad database, similar to the ad database described above in connection with FIG. 7, is also stored locally. As the end user moved throughout the geographic region, the end user's position is determined using any appropriate means, such as positioning equipment.

Then, when the end user enters an advertising zone, an advertising message is provided from the ad database (which is stored locally) to the end user via the user interface of the end user's standalone computing platform. Thus, a standalone computing platform provides advertising messages to the end user in a similar manner as embodiments in which the advertising messages are provided from a remote location.

D. Other Ways to Form Advertising Zones

In some of the above embodiments, advertising zones were shown as being bounded areas. Advertising zones (as well as other types of zones) are not limited to bounded areas. Advertising zones may also be defined based on accessibility, such as driving accessibility or walking accessibility. For example, stretches of an interstate highway would share advertising codes with establishments near the highway only if a ramp provides reasonable accessibility. This would allow restaurants, gas stations, and such, to advertise to passing motorists only if the passing motorists could easily get to the establishment.

Another example of an advertising zone based on accessibility is a zone that includes all the locations along roads within a defined driving distance (or driving distance) of a specific location. For example, an advertising zone may be defined for all the roads within a 15 minute driving time (or distance) of an office building.

Figure 8A:
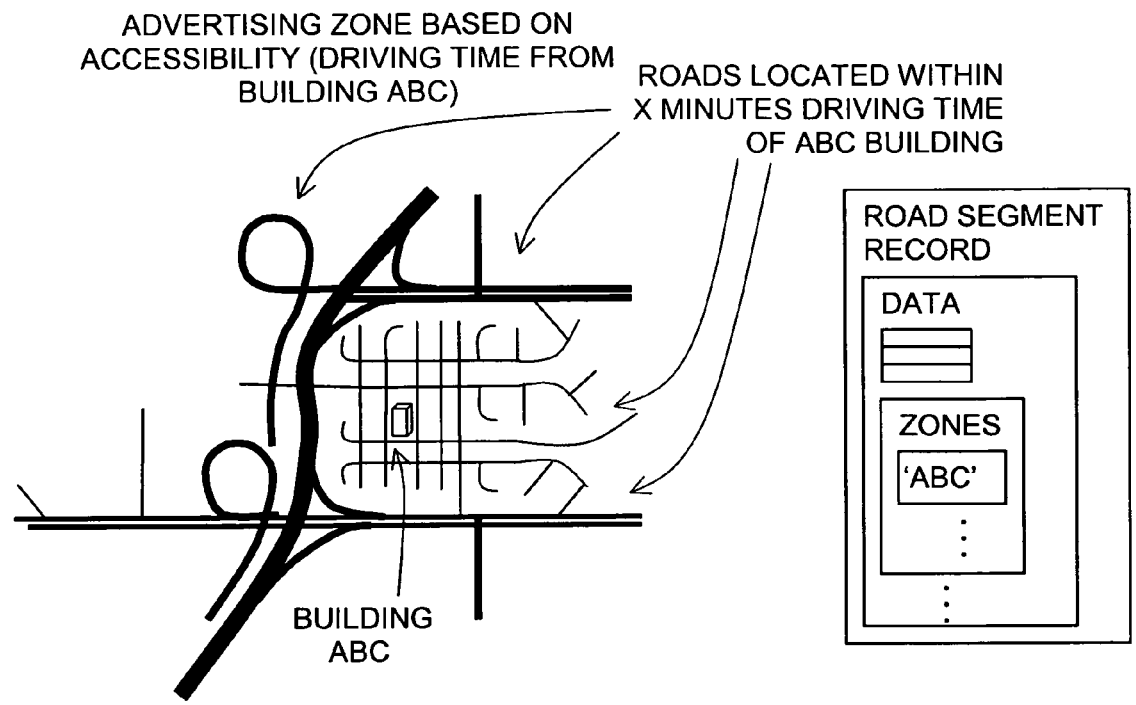
FIGS. 8A and 8B illustrate accessibility-based advertising zones used in connection with alternative embodiments.
Figure 8B:
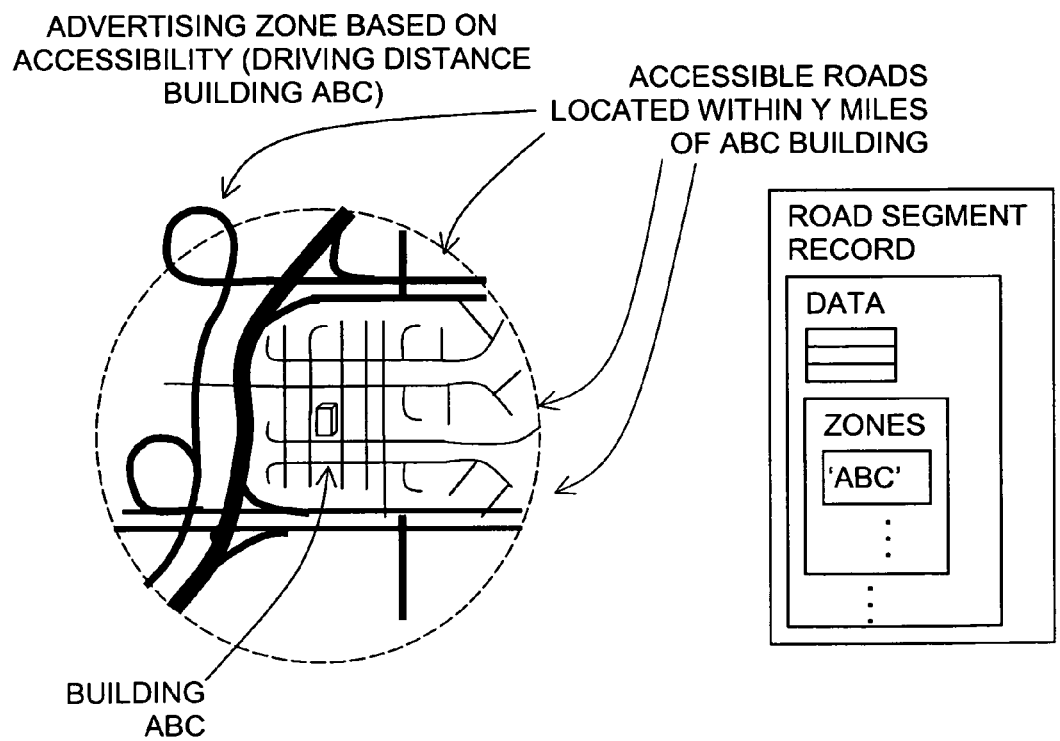

FIGS. 8A and 8B show examples of advertising zones based on accessibility.

E. Advertising Points

Another way to facilitate the delivery of location-based advertising messages is to designate points along navigable roads as locations at which advertising messages may be delivered. This method would establish 'virtual billboard' locations along roads in a geographic region. A navigation services provider would then enter into agreements with advertisers to deliver messages to end users who pass the established 'virtual billboard' locations.

According to this embodiment, the virtual billboard locations would be designated at specific locations along road segments. The locations selected for virtual billboard locations may be appropriately spaced from intersections so that advertising messages associated with the locations do not interfere with any maneuvering guidance to be provided at the intersection.

As in some of the embodiments described above, a navigation services provider agrees to deliver advertising messages end users. In this embodiment, the advertising message is delivered to an end user who travels past the virtual billboard location.

According to this embodiment, as an end user travels along roads in a geographic region, the end user is in communication with a navigation services provider. The end user may be receiving navigation-related services from the navigation services provider or alternatively, the end user may not be receiving navigation-related services. While the end user is traveling along roads, the end user's position is determined. The location of the end user is determined using any means, such as positioning equipment (e.g., GPS, inertial sensors, and so on) associated with the end user's computing platform, by user input, etc. The end user's location is matched to data representing roads in the geographic region. The data that represent roads also include data that represent locations along the roads at which advertising messages are to be provided (e.g., virtual billboard locations). When the end user's location passes the location of the virtual billboard, the end user is provided with an advertising message.

This embodiment has numerous advantages over traditional, physical billboards. For example, a virtual billboard is not subject to local ordinances or zoning restrictions. In addition, the advertising message provided by a virtual billboard can be changed easily.

FIG. 9 illustrates this embodiment.

F. Dynamic Advertising Zones

In some of the above embodiments, advertising zones were described as being defined with respect to data contained in a geographic database used to provide navigation-related features and services. In an alternative embodiment, advertising zones may be defined dynamically. Dynamic advertising zones are not defined permanently with respect to data contained in a geographic database. Instead, dynamic advertising zones may be defined and used on an as-needed basis, with respect to the geographic data.

It is intended that the foregoing detailed description be regarded as illustrative rather than limiting and that it is understood that the following claims including all equivalents are intended to define the scope of the invention.

We claim:

1. A method of facilitating delivery of advertising to users of mobile computing platforms comprising the steps of:
   defining advertising zones within a geographic region;
   defining a hierarchy of said advertising zones,
      wherein said hierarchy of advertising zones includes at least a first layer and a second layer, and further,
      wherein at least some of the advertising zones in said first layer overlap some of the advertising zones in said second layer;
   providing a geographic database that contains road segment data, said road segment data represents a road segment located in the geographic region, said road segment data comprising data that indicates in which of said advertising zones the road segment is located;
   associating advertising messages with at least some of said advertising zones; and
   storing said advertising messages in an advertising database.

2. The method of claim 1 further comprising:
   defining an index that references each of the advertising zones in the first layer that overlap each of the advertising zones in the second layer.

3. The method of claim 1 wherein said advertising zones are formed dynamically.

4. A method of facilitating delivery of advertising to users of geographic data comprising the steps of:
   defining a plurality of advertising areas located within a geographic region;
   defining a hierarchy of said advertising areas,
      wherein said hierarchy of advertising areas includes at least a first layer and a second layer, and further,
      wherein at least some of the advertising areas in said first layer overlap some of the advertising areas in said second layer;
   providing a geographic database that contains road segment data that represent road segments located in the geographic region, and advertising area data that indicate which of said road segments are located in said advertising areas.

5. The method of claim 4 further comprising:
   defining an index that references the advertising areas in the first layer that overlap the advertising zones in the second layer.

6. The method of claim 4 wherein said advertising areas are based on accessibility.

7. The method of claim 4 wherein said advertising areas are based driving distances from defined locations.

8. The method of claim 4 wherein said advertising areas are based driving times from defined locations.

9. The method of claim 4 wherein said advertising areas are formed dynamically.

10. A geographic database stored on a computer-readable medium comprising:
  road segment data that represent road segments located in a geographic region; and advertising zone data that indicate which of a plurality of advertising zones into which the geographic region is divided the road segments are located in,
  wherein said advertising zones define a hierarchy including at least a first layer and a second layer, and further,
  wherein at least some of the advertising zones in said first layer overlap some of the advertising zones in said second layer,
  wherein at least some of said advertising zones are associated with advertising messages,
  wherein said advertising messages are stored in said database.

11. The invention of claim 10 wherein said geographic database further comprises:
  an index that references advertising zones that encompass other advertising zones.

12. The invention of claim 10 wherein said geographic database is installed in a standalone navigation system.

13. The invention of claim 10 wherein said geographic database is installed on a navigation services server from which end users' computing platforms obtain geographically-related services.

14. The invention of claim 10 wherein said advertising zone data includes an indication of which of a plurality of layers of advertising zones, a particular advertising zone is located in.

* * * * *